US010156193B2

(12) United States Patent
Mogavero et al.

(10) Patent No.: US 10,156,193 B2
(45) Date of Patent: Dec. 18, 2018

(54) METHOD OF OPERATING AN INTERNAL COMBUSTION ENGINE

(71) Applicant: GM GLOBAL TECHNOLOGY OPERATIONS LLC, Detroit, MI (US)

(72) Inventors: Armando Mogavero, Turin (IT); Alberto Racca, Cavallermaggiore (IT); Joaquin De La Morena, Valencia (ES)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 53 days.

(21) Appl. No.: 15/235,811

(22) Filed: Aug. 12, 2016

(65) Prior Publication Data

US 2017/0045000 A1    Feb. 16, 2017

(30) Foreign Application Priority Data

Aug. 13, 2015 (GB) .................................. 1514401.7

(51) Int. Cl.
| | |
|---|---|
| *F01N 3/00* | (2006.01) |
| *F02D 13/02* | (2006.01) |
| *F02D 41/02* | (2006.01) |
| *F02D 41/00* | (2006.01) |

(52) U.S. Cl.
CPC ....... *F02D 13/0249* (2013.01); *F02D 41/027* (2013.01); *F02D 41/0245* (2013.01); *F02D 2041/001* (2013.01); *F02D 2200/08* (2013.01); *Y02T 10/18* (2013.01); *Y02T 10/26* (2013.01)

(58) Field of Classification Search
USPC ....... 60/274, 284, 285, 295, 297; 123/90.11, 123/90.15, 90.16, 90.17
See application file for complete search history.

(56) References Cited

U.S. PATENT DOCUMENTS

| | | | | |
|---|---|---|---|---|
| 5,233,831 | A  * | 8/1993  | Hitomi .................. | F01N 3/2006 123/179.18 |
| 5,848,529 | A  * | 12/1998 | Katoh ....................... | F01L 1/34 60/274 |
| 6,360,531 | B1 * | 3/2002  | Wiemero .................. | F01L 1/34 123/299 |
| 6,837,040 | B2 * | 1/2005  | Sonoda ..................... | F01L 1/34 123/295 |

(Continued)

FOREIGN PATENT DOCUMENTS

JP    H09166051 A    6/1997

OTHER PUBLICATIONS

Great Britain Patent Office, Great Britain Search Report for Great Britain Application No. 1514401.7, dated Mar. 3, 2016.

*Primary Examiner* — Binh Q Tran
(74) *Attorney, Agent, or Firm* — Lorenz & Kopf, LLP

(57) ABSTRACT

A method is disclosed for operating an internal combustion engine equipped with an aftertreatment device. The internal combustion engine is equipped with a cylinder having an exhaust gas port intercepted by an exhaust valve, the exhaust valve being actuated by means of a Variable Valve Actuation (VVA) system, An aftertreatment device regeneration is detected, and the exhaust valve closure is anticipated using the Variable Valve Actuation (VVA) system during the aftertreatment device regeneration to provide an exhaust valve actuation profile having an anticipated exhaust valve closure with respect to a baseline exhaust valve actuation profile.

6 Claims, 4 Drawing Sheets

(56) References Cited

U.S. PATENT DOCUMENTS

| | | | |
|---|---|---|---|
| 7,000,380 B2* | 2/2006 | Tokuyasu | F02D 13/0219 123/295 |
| 7,191,589 B2* | 3/2007 | Yasui | F01L 1/08 123/90.15 |
| 8,091,345 B2* | 1/2012 | Farrell | F02D 13/0242 123/90.15 |
| 2003/0221421 A1 | 12/2003 | Gui et al. | |
| 2012/0222407 A1 | 9/2012 | Miwa et al. | |
| 2014/0325963 A1 | 11/2014 | Nagaoka et al. | |
| 2015/0275723 A1 | 10/2015 | Koch et al. | |

\* cited by examiner

600 - Regeneration active?

610 - Anticipate valve closure

METHOD OF OPERATING AN INTERNAL COMBUSTION ENGINE

CROSS-REFERENCE TO RELATED APPLICATION

This application claims priority to British Patent Application No. 1514401.7, filed Aug. 13, 2015, which is incorporated herein by reference in its entirety.

TECHNICAL FIELD

The present disclosure pertains to a method of operating an internal combustion engine.

BACKGROUND

Due to continuously more stringent emission requirements, internal combustion engines are equipped with aftertreatment exhaust gas systems, such as Diesel Oxidation Catalyst (DOC), Diesel Particulate Filters (DPF), Lean $NO_x$ Traps (LNT), and/or a Selective Catalytic Reduction (SCR) systems or SCRFs (SCR on and so on, whose conversion efficiency is strictly related to the exhaust gas temperature. Future required levels of $CO_2$ imposed by legislation will drive towards lower temperatures in the exhaust line, generating critical working conditions that may impact the ability of the aftertreatment systems to operate at optimal efficiency.

Several valve control technologies have been developed; one of these is Variable Valve Actuation (VVA), in terms of valve timing or lift, allowing adopting optimized cam lobe profiles for intake and/or exhausting valves. Known Diesel application of VVA is mainly intended to reinforce the swirl of fresh charge, for example by actuation of one intake valve, or to generate internal Exhaust Gas Recirculation (EGR) by reopening of exhaust valves, improving the capability to meet emissions certification requirements.

In customer-related real driving conditions, aftertreatment systems need to be frequently regenerated in order to ensure the required conversion efficiency, and the regeneration processes do not have a negligible impact on fuel consumption. To be effective, a regeneration process, either Desulphation for a LNT or Soot oxidation for a DPF or other regeneration processes, typically requires a sufficiently high and stable exhaust gas temperature upstream of the aftertreatment system.

The exhaust gas temperature is strictly related to the engine speed and load values, therefore in current internal combustion engines, the use of extra-fuel through after or post injections, namely late injections scheduled at open exhaust valves, or by a dedicated fuel injector provided in the exhaust line is deployed to ensure the needed temperature levels during aftertreatment regenerations.

Another issue may be given by oil dilution due to portions of fuel reaching the oil sump and consequent oil life deterioration when performing post-injections, with impact on the customer due to more frequent service need.

Emissions and $CO_2$ deterioration are also to be accounted for during homologation cycles.

A further issue is given by a reduced efficiency of aftertreatment processes, such as DPF regeneration or LNT De-sulphation, due to unstable temperature under customer real driving conditions, leading to high unburned soot residuals or lower Sulphur removed at the end of the regeneration process. That means increased regeneration duration or frequency, penalizing fuel economy, due to higher number of regeneration events over component life, system performance deterioration (oxidation capacity) due to thermal stress or ageing because of increased time exposure to high temperatures reached during regeneration process, with potential drawbacks on emissions. Also, a high calibration effort of post-injection control may be needed to enable a sufficiently stable upstream aftertreatment system temperature in every driving conditions.

Finally, during real customer driving conditions, the city cycle is one of the most critical profiles for regeneration process effectiveness: the frequent operations at low engine speed and load with accelerations, decelerations and idle engine speed lead to a highly variable and unstable temperature at the engine outlet and to a consequent very complex control of the post-injection to guarantee the achievement of the required temperatures.

SUMMARY

In accordance with the present disclosure, a method is provided for operating an internal combustion engine that has an increase of gas temperatures upstream the aftertreatment system without, at the same time, further penalizing the fuel consumption. An embodiment of the disclosure provides a method of operating an internal combustion engine equipped with an aftertreatment device, the internal combustion engine being equipped with a cylinder having an exhaust gas port intercepted by an exhaust valve, the exhaust valve being actuated by a Variable Valve Actuation (VVA) system, An aftertreatment device regeneration is detected, and the exhaust valve closure is anticipate using the Variable Valve Actuation (VVA) system during the aftertreatment device regeneration to provide an exhaust valve actuation profile having an anticipated exhaust valve closure with respect to a baseline exhaust valve actuation profile. An advantage of this embodiment is that, by anticipating the exhaust valve closure, an increased exhaust gas temperature upstream of the aftertreatment system may be obtained, limiting the needed extra-fuel to reach the target temperatures for efficient regeneration. Furthermore, a benefit in emission compliance during certification may be achieved, due to minor impact of $CO_2$ penalty on aftertreatment regeneration cycles. Also, an improved oil life due to reduction in oil dilution may be achieved, because of the reduced use of extra-fuel through post-injections, According to another embodiment, the exhaust valve actuation profile provides an anticipated closure crank angle with respect to a baseline closure crank angle. An advantage of this embodiment is that an improved temperature control during real driving conditions when regeneration occurs may be achieved, due to increased average exhaust gas temperature.

According to another embodiment, the difference between the anticipated closure crank angle and the baseline closure crank angle does not exceed 55°. An advantage of this embodiment is that it sets an optimal range for controlling the exhaust valve anticipated closure. According to another embodiment, the difference between the anticipated closure crank angle and the baseline closure crank angle does not exceed 40°.

According to another embodiment, the step of providing an exhaust valve actuation profile having an anticipated exhaust valve closure with respect to a baseline exhaust valve actuation profile is performed at low engine speed and load. An advantage of this embodiment is that anticipated exhaust valve closure occurs in the region of critical engine operation in terms of exhaust temperature for aftertreatment regeneration processes, namely the low engine speed and load region, but due to low exhaust flow, the local increase in $CO_2$ emissions does not significantly impact the cumulated cycle quantity.

The present disclosure is further directed to an apparatus for operating an internal combustion engine equipped with an aftertreatment device, the internal combustion engine being equipped with a cylinder having an exhaust gas port intercepted by an exhaust valve, the exhaust valve being actuated by a Variable Valve Actuation (VVA) system. The apparatus includes an electronic control unit or other means for detecting an aftertreatment device regeneration, and an electronic control unit or other means for anticipating the exhaust valve closure, during the aftertreatment device regeneration, using the Variable Valve Actuation (VVA) system to provide an exhaust valve actuation profile having an anticipated exhaust valve closure with respect to a baseline exhaust valve actuation profile. Advantages of this aspect are similar to those of the method according to the various embodiments of the present disclosure namely, by anticipating the exhaust valve closure, an increased exhaust gas temperature upstream of the aftertreatment system may be obtained, limiting the needed extra-fuel to reach target temperatures for efficient regeneration.

According to another aspect, the electronic control unit or other means is configured to anticipate the exhaust valve closure by a predetermined crank angle with respect to a baseline closure crank angle include a sliding cam mechanization system. An advantage of this aspect is that it controls the closure of the exhaust valve in a load step fashion.

According to another aspect, the electronic control unit or other means is configured to anticipate the exhaust valve closure by a predetermined crank angle with respect to a baseline closure crank angle include a continuous Variable Valve Actuation system. An advantage of this aspect is that it controls the closure of the exhaust valve in a continuous fashion due to the fact that such system may be mechanized with the use of a cam phaser.

The method according to one of its aspects can be carried out with the help of a computer program including a program-code. The computer program product can be embodied as a control apparatus for an internal combustion engine, including an Electronic Control Unit (ECU), a data carrier associated to the ECU, and the computer program stored in a data carrier, so that the control apparatus defines the embodiments described in the same way as the method. In this case, when the control apparatus executes the computer program, all the steps of the method described above are carried out.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
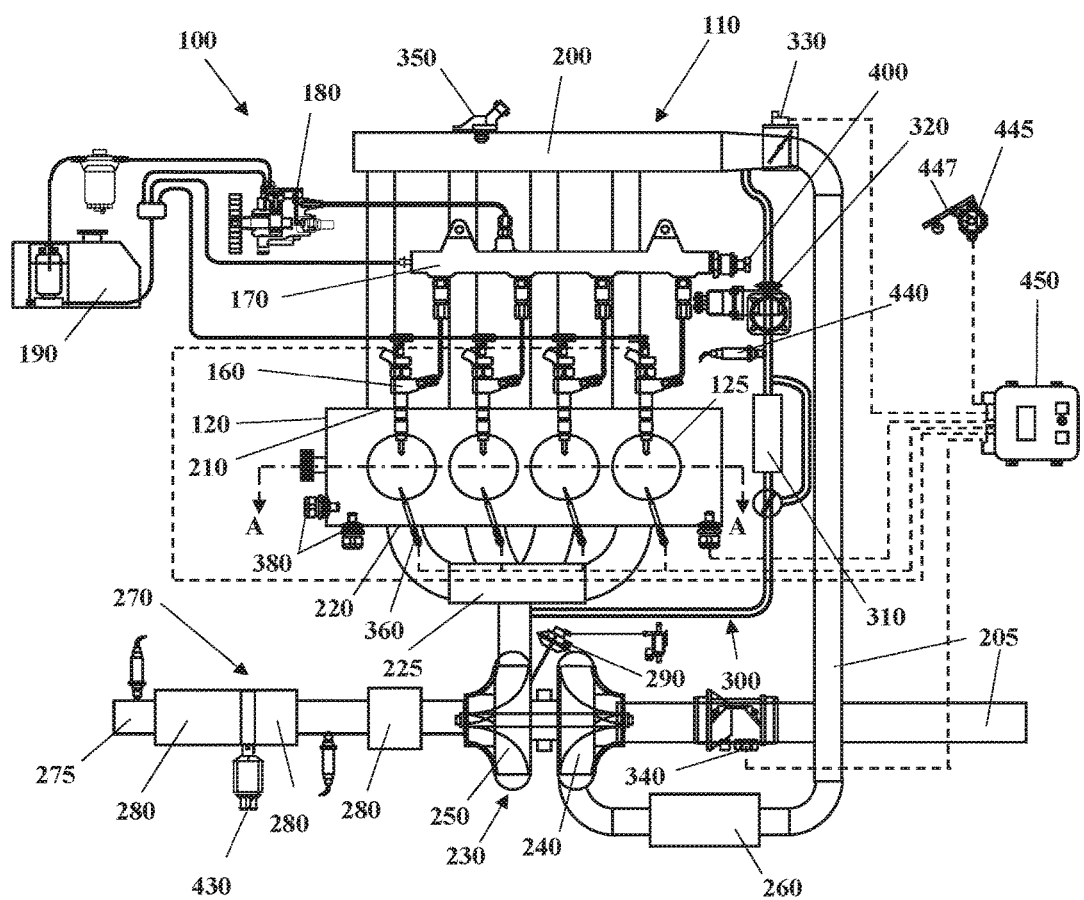
FIG. 1 shows an automotive system.
Figure 2:
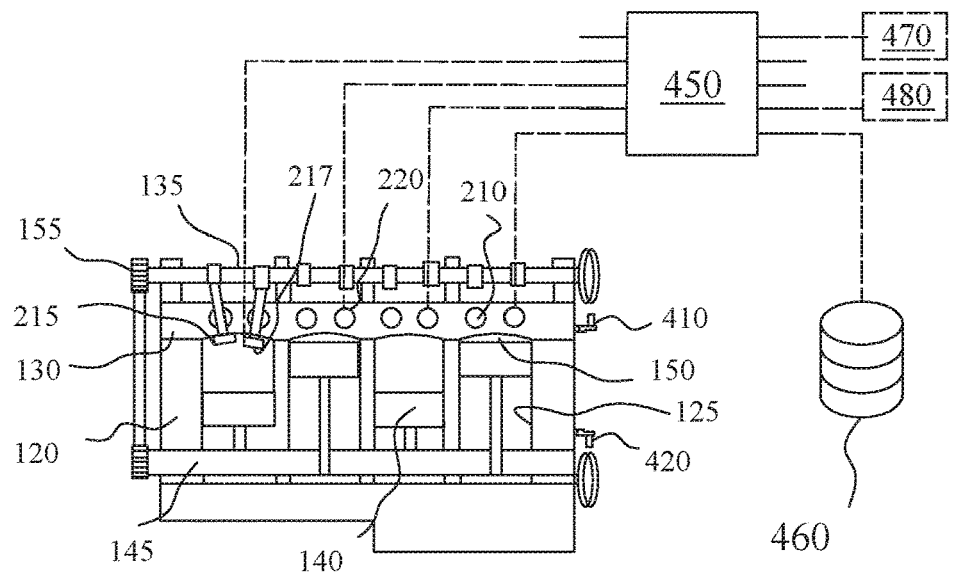
FIG. 2 is a cross-section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increases the pressure of the fuel received from a fuel source 190.

In FIG. 2 it is also shown that each of the cylinders 125 has at least an intake valve 215 and an exhaust valve 217, both actuated by a camshaft 135 rotating in time with the crankshaft 145. The intake valves 215 selectively allow air into the combustion chamber 150 from the port 210 and the exhaust valves 217 alternately allow exhaust gases to exit through a port 220. In some examples, a cam phaser 155 may selectively vary the timing between the camshaft 135 and the crankshaft 145. More in particular, several known VVA technologies can be used to implement the various embodiments of the present disclosure.

By way of example, with no limiting purposes, a first technology that can be used is a sliding cam mechanization system 470 where two or more cam profiles are used in combination with an actuator used to swap between the profiles, depending on various conditions such as engine speed or engine load. Cam switching provides a discrete or step load variation of valve lift profile. An alternative technology is the use of a continuous Variable Valve Actuation system. Such system may be mechanized with the use of a cam phaser 480, namely a device equipped with two concentric shafts, an external shaft supporting the cams and an eccentric internal shaft used to vary the position of the cams, the cam phaser device 480 being able to provide a continuous variation of valve lift profile. In any case, each of the VVA systems that may be used is controlled by an Electronic Control Unit 450 of the engine 110.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. A charge air cooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move a rack of vanes 295 in different positions, namely from a fully closed position to a fully open position, to alter the flow of the exhaust gases through the turbine 250. In other embodiments, the turbocharger 230 may be fixed geometry and/or include a waste gate.

The exhaust gases of the engine are directed into an exhaust system 270. The exhaust system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean NOx traps, hydrocarbon adsorbers, selective catalytic reduction (SCR) systems, and particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110 and with a memory system and an interface bus. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor that may be integral within glow plugs 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal 447 position sensor 445. Furthermore, the ECU 450 may generate output signals to various control devices that are arranged to control the operation of the ICE 110, including, but not limited to, the fuel injectors 160, the throttle body 330, the EGR Valve 320, a Variable Geometry Turbine (VGT) actuator 290, and the cam phaser 155. Note, dashed lines are used to indicate communication between the ECU 450 and the various sensors and devices, but some are omitted for clarity.

Figure 7:
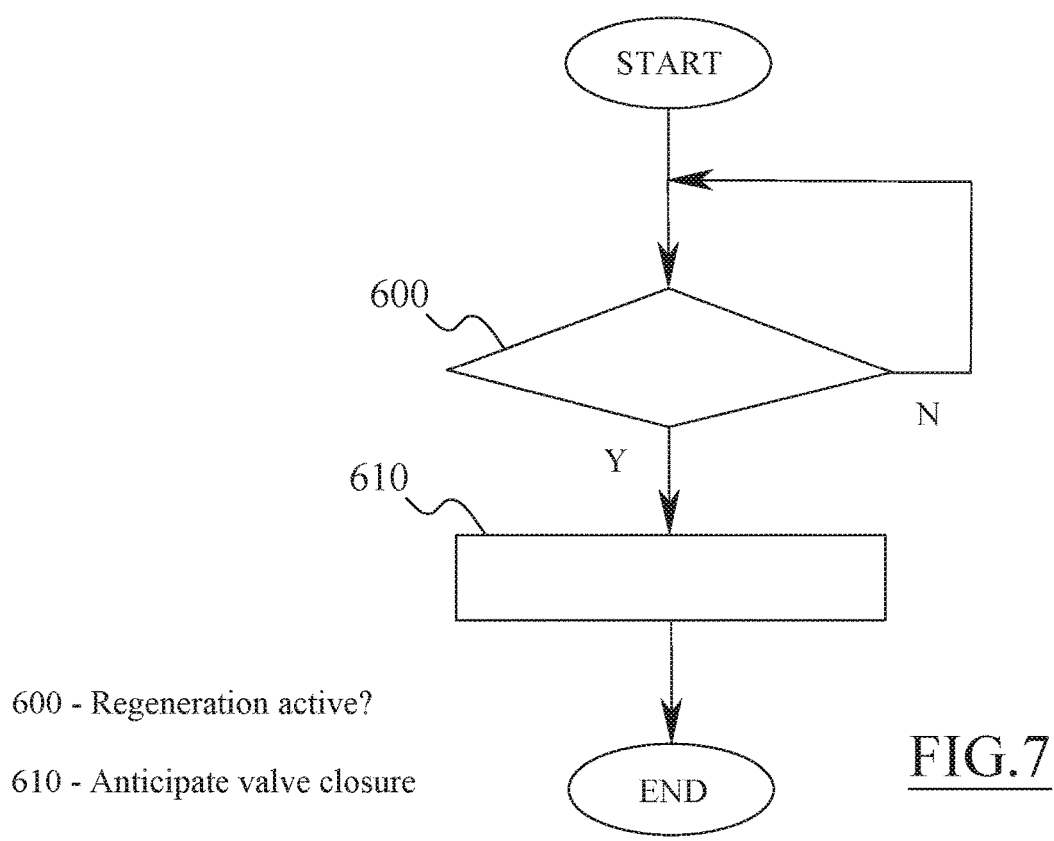
FIG. 7 is a flowchart representing an embodiment of the method of the present disclosure.

FIG. 7 is a flowchart representing an embodiment of the method of the present disclosure. A first step of the method is to determine if an aftertreatment device 280 regeneration is active (block 600). In the affirmative, the exhaust valve 217 closing of each of the cylinder 125 is anticipated by a predetermined crank angle with respect to a baseline exhaust valve closure crank angle (block 610). If no aftertreatment device 280 regeneration is active, the method continues checking for the occurrence of an aftertreatment device 280 regeneration.

In general the method provides for anticipating the exhaust valve 217 closure, during the aftertreatment device regeneration, using the Variable Valve Actuation (VVA) system to provide an exhaust valve 217 actuation profile having an anticipated exhaust valve 217 closure with respect to a baseline exhaust valve 217 actuation profile. The exhaust valve 217 actuation profile provides an anticipated closure crank angle with respect to a baseline closure crank angle. Different values of anticipated exhaust valve closure crank angle can be chosen to define the predetermined crank angle with respect to a baseline closure crank angle, In general, the difference between the anticipated closure crank angle and the baseline closure crank angle does not exceed 55°. According to a preferred embodiment, the difference between the anticipated closure crank angle and the baseline closure crank angle does not exceed. 40°. By anticipating the exhaust valve 217 closing, an increased exhaust gas temperature upstream of the aftertreatment system is obtained, limiting the needed extra-fuel to reach target temperature for efficient regeneration. Furthermore, a benefit in emission compliance during certification may be achieved, due to minor impact of $CO_2$ penalty of aftertreatment regeneration cycles.

Figure 3:
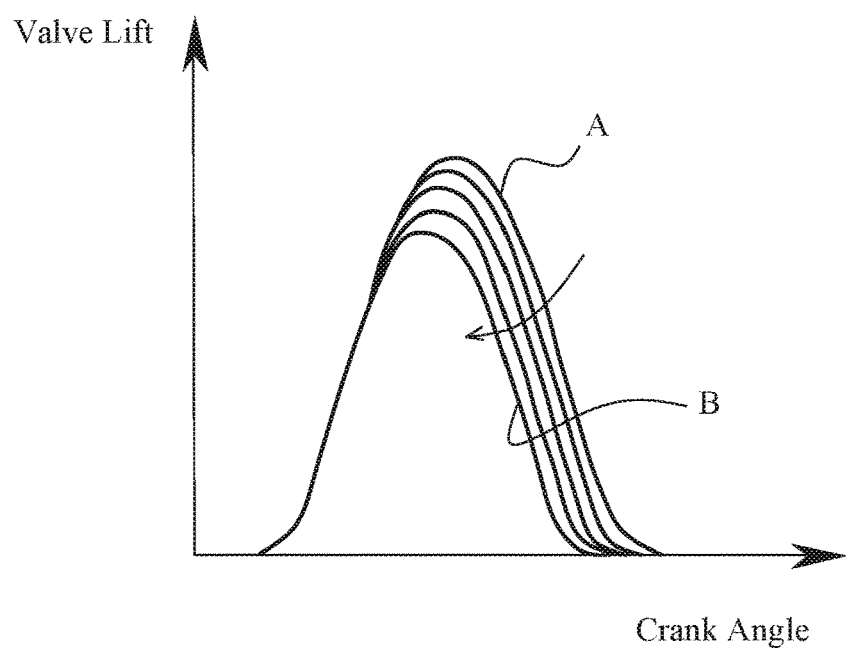
FIG. 3 shows a graph representing various cylinder exhaust valve lift profiles as a function of crank angle.
Figure 4:
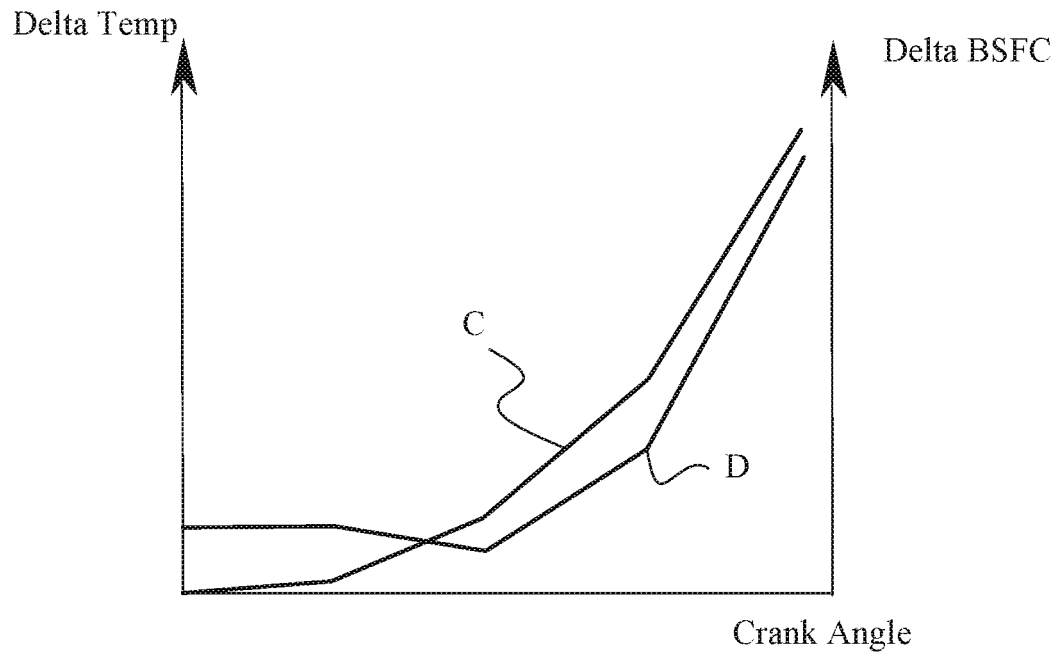
FIG. 4 shows curves of a difference of temperature and of a difference of Brake Specific Fuel Consumption (BSFC), as a function of crank angle.
Figure 5:
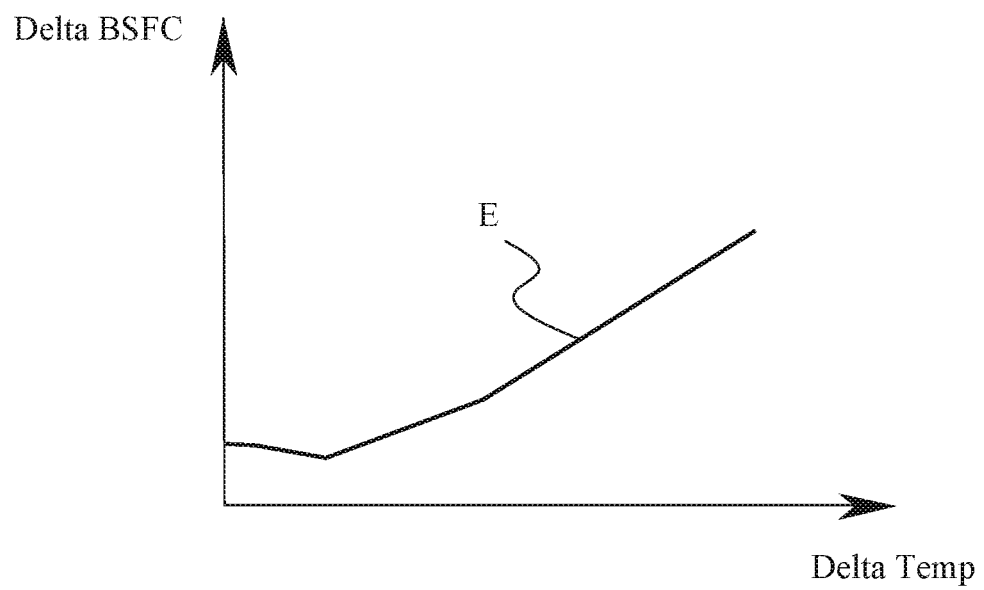
FIG. 5 shows a graph combining the difference of temperature and the difference of Brake Specific Fuel Consumption (BSFC) as a function different crank angles of FIG. 4.

FIGS. 3-5 refers to a simulation activity performed to validate the effectiveness of the various embodiments of the present disclosure. In particular, FIG. 3 shows a graph representing various cylinder exhaust valve lift profiles as a function of crank angle. In the simulation activity, starting from a valve profile baseline configuration (curve A), a series of Exhaust Valve Closing (EVC) events have been simulated in one engine point within DPF Regeneration boundary conditions to explore the exhaust gas temperature effect versus the Fuel Consumption increase. The tested profiles such as curve B) are characterized by a reduction of maximum exhaust valve lift compared to a baseline exhaust valve lift and an advance in exhaust valve closing up to 55° Crank Angle (CA) earlier than baseline condition.

FIG. 4 shows curves of a difference of temperature (curve C) and of a difference of Brake Specific Fuel Consumption (BSFC) (curve D) as a function of crank angle. FIG. 5 shows a graph (curve E) combining the difference of temperature and the difference of Brake Specific Fuel Consumption (BSFC) as a function different crank angles derived from the data of FIG. 4.

The effects of an early Exhaust Valve Closing on the exhaust temperature gas increase can be summarized as follows, Higher pumping losses (PMEP) need to be compensated by a higher IMEP (Indicated Mean Effective Pressure) to maintain the same BMEP (Break Mean Effective Pressure), which represents the net work available at the engine shaft; therefore more fuel has to be injected, with consequent increase in exhaust gas temperature, as expressed by the following equation (1):

$$BMEP=IMEP-PMEP \qquad (1)$$

The method according to the various embodiments of the present disclosure is preferably used at low engine speed and load. An example of low engine speed and load region is given by an engine speed lower than 2000 rpm and an engine BMEP lower than 5 bar. Such region is the region of critical engine operation in terms of exhaust temperature for aftertreatment regeneration processes.

Figure 6:
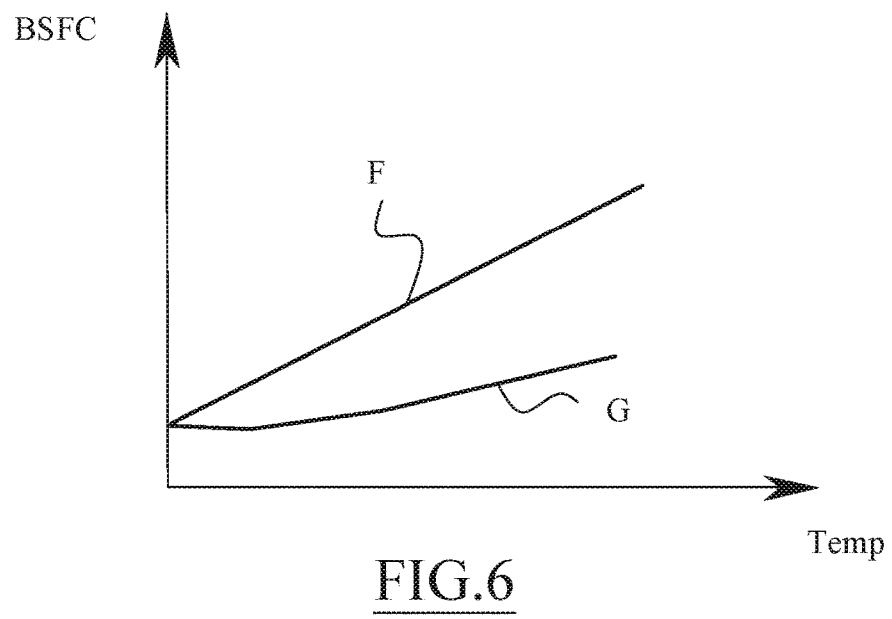
FIG. 6 shows a comparative graph of a BSFC increase as a function of an exhaust gas temperature increase between a prior art strategy and a strategy according to an embodiment of the present disclosure.

FIG. 6 shows a comparative graph of a Brake Specific Fuel Consumption (BSFC) increase as a function of an exhaust gas temperature increase between a prior art strategy (curve F) and a strategy according to an embodiment of the present disclosure (curve G). From the graph of FIG. 6, it can be seen that, compared to current aftertreatment strategies for optimal regeneration, in an engine steady state point, a promising trend of BSFC reduction at equivalent exhaust temperature increase is shown. The use of a dedicated exhaust valve timing at low engine speed and load increases the engine out exhaust gas temperature, thus reducing the need of extra-fuel to reach required temperature upstream of the aftertreatment system, simplifying the post-injection control calibration effort.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of operating an internal combustion engine having a cylinder with an exhaust gas port interrupted by an exhaust valve operable by a variable valve actuation system to close the exhaust gas port and an exhaust gas aftertreatment system in communication with the exhaust gas port, the method comprising:
    detecting a regeneration of the aftertreatment system;
    anticipating a closure of the exhaust gas port by the exhaust valve, during the aftertreatment device regeneration, using the variable valve actuation system to provide an exhaust valve actuation profile hacving an anticipated exhaust valve closure with respect to a baseline exhaust valve actuation profile; and
    wherein the exhaust valve actuation profile provides an anticipated closure crank angle with respect to a baseline closure crank angle and the difference between the anticipated closure crank angle and the baseline closure crank angle does not exceed 55°.

2. The method according to claim 1, wherein the difference between the anticipated closure crank angle and the baseline closure crank angle does not exceed 40°.

3. The method according to claim 1, further comprising providing an exhaust valve actuation profile having an anticipated exhaust valve closure with respect to a baseline exhaust valve actuation profile when the engine is operating at low engine speed and low load.

4. An exhaust gas aftertreatment system for an internal combustion engine having a cylinder with an exhaust gas port interrupted by an exhaust valve operable by a variable valve actuation system to close the exhaust gas port, the system comprising:
    an aftertreatment device operable in a regeneration state; and
    an electronic control unit configured to:
        detect a regeneration of the aftertreatment device; and
        anticipate the exhaust valve closure, during the aftertreatment device regeneration, using the variable valve actuation system to provide an exhaust valve actuation profile having an anticipated exhaust valve closure with respect to a baseline exhaust valve actuation profile such that the difference between the anticipated closure crank angle and the baseline closure crank angle does not exceed 55°.

5. The apparatus according to claim 4, further comprising a sliding cam mechanization system configured to anticipate the exhaust valve closure.

6. The apparatus according to claim 4, further comprising a continuous variable valve actuation configured to anticipate the exhaust valve.

\* \* \* \* \*